N. A. GASTON.
Car-Propeller.

No. 221,227.  Patented Nov. 4, 1879.

Attest:
N. M. Lowry
L. Robinson

Inventor:
Nathan A. Gaston
F. A. Lehmann, atty

UNITED STATES PATENT OFFICE.

NATHAN A. GASTON, OF NEW PROSPECT, MISSISSIPPI.

IMPROVEMENT IN CAR-PROPELLERS.

Specification forming part of Letters Patent No. 221,227, dated November 4, 1879; application filed April 30, 1879.

*To all whom it may concern:*

Be it known that I, NATHAN ALEXANDER GASTON, of New Prospect, Choctaw county, Mississippi, have invented a new and useful Machine for Propelling Cars, of which the following is a specification.

My invention relates to an improvement in propelling cars by horse-power; and it consists in placing a tread-power provided with a reversing mechanism upon a car, whereby horses can be used to propel cars upon the railroad where it would not pay to run a locomotive or use steam, and at the same time do away with the noise and danger that are always attendant upon the use of steam in cities, as will be more fully described hereinafter.

Figure 1:
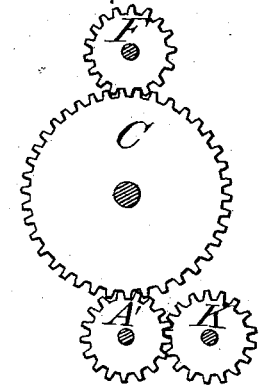
Figure 2:
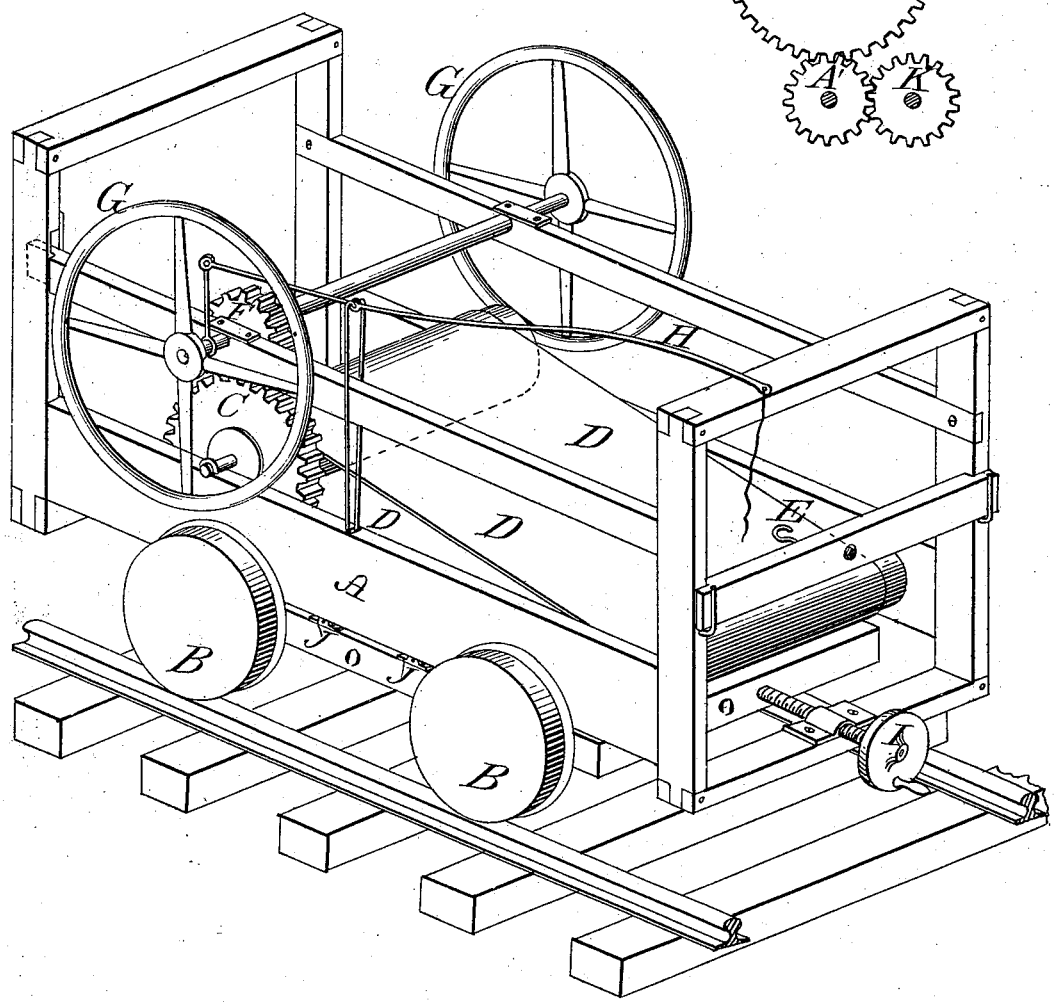

Figure 1 is a part vertical section, showing the reversing mechanism. Fig. 2 is a perspective view of one of my propellers complete.

A represents a suitable truck or frame of a car, which is provided with the wheels B. Upon one of the axles is secured a pinion, A', which meshes with the large cog-wheel C on one of the rollers or shafts, which operates the tread or endless band D.

Placed above the wheel C is a pinion, F, which is secured to a shaft which has a fly-wheel, G, on each end, so as to greatly increase the power of the car in running. This shaft is intended to be raised vertically in its bearings far enough to lift the pinion F out of gear with the wheel C, so that in stopping the car suddenly the power of the two wheels G will be instantly taken away, so far as the propulsion of the car is concerned.

The lever H is here shown for the purpose of raising the shaft; but any other means will answer as well.

The horse is placed upon the tread D, and hitched to the cross-bar E, which is made removable so that he can pass in and out. As it is necessary that the car shall run both backward and forward upon the track, a frame, O, is placed under the frame A, and this frame is moved back and forth under the frame A by means of the screw I, there being friction-rollers J placed between the two frames, so as to make the movement easier.

By forcing the frame forward, the pinion A' will be forced forward so that it will no longer mesh with the wheel C, when the wheel K will be brought into play, which will give a reverse motion to the wheels B, and cause the car to run in the opposite direction.

Having thus described my invention, I claim—

The combination of a truck-frame, A, a tread-power, D, and an actuating mechanism connected to the tread, with a sliding frame, O, and screw I, substantially as shown and described.

N. A. GASTON.

Witnesses:
    JNO. O. WOODWARD,
    J. F. GASTON.